(12) United States Patent
Peschko et al.

(10) Patent No.: US 8,658,547 B2
(45) Date of Patent: Feb. 25, 2014

(54) COMPOSITIONS FOR TEXTILE COATINGS

(75) Inventors: Christian Peschko, Burghausen (DE); Johann Müller, Neuötting (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/318,739

(22) PCT Filed: Apr. 28, 2010

(86) PCT No.: PCT/EP2010/055696
§ 371 (c)(1),
(2), (4) Date: Nov. 3, 2011

(87) PCT Pub. No.: WO2010/127977
PCT Pub. Date: Nov. 11, 2010

(65) Prior Publication Data
US 2012/0052758 A1      Mar. 1, 2012

(30) Foreign Application Priority Data
May 5, 2009   (DE) .......................... 10 2009 002 828

(51) Int. Cl.
*D06M 15/643*   (2006.01)
*C09D 183/05*   (2006.01)
*C09D 7/12*     (2006.01)

(52) U.S. Cl.
USPC .............................. 442/59; 524/588; 427/387

(58) Field of Classification Search
None
See application file for complete search history.

(56) References Cited

U.S. PATENT DOCUMENTS

| | | | |
|---|---|---|---|
| 3,867,343 A * | 2/1975 | Garden .......................... 528/15 |
| 3,922,443 A | 11/1975 | Brown et al. |
| 3,936,581 A * | 2/1976 | Garden ......................... 428/447 |
| 4,028,298 A | 6/1977 | Dumoulin |
| 4,071,644 A | 1/1978 | Grenoble |
| 4,082,726 A | 4/1978 | Mine |
| 4,262,107 A | 4/1981 | Eckberg |
| 4,281,093 A * | 7/1981 | Garden ........................... 528/15 |
| 4,492,775 A | 1/1985 | Koshii et al. |
| 4,569,980 A | 2/1986 | Sasaki |
| 4,972,001 A * | 11/1990 | Kimura et al. ................... 521/77 |
| 5,004,643 A * | 4/1991 | Caldwell ......................... 442/82 |
| 5,036,117 A | 7/1991 | Chung |
| 5,057,151 A | 10/1991 | Schuster |
| 5,208,097 A | 5/1993 | Honma et al. |
| 5,399,402 A * | 3/1995 | Inoue et al. ................... 428/35.7 |
| 5,519,067 A | 5/1996 | Yaginuma et al. |
| 5,705,445 A | 1/1998 | Chikaraishi |
| 5,767,193 A | 6/1998 | Fujiki |
| 5,854,344 A | 12/1998 | Shiono |
| 5,877,256 A * | 3/1999 | Nakamura et al. ............ 524/765 |
| 6,037,279 A * | 3/2000 | Brookman et al. ............. 442/71 |
| 6,354,620 B1 | 3/2002 | Budden et al. |
| 6,387,451 B1 * | 5/2002 | Collins et al. .................. 427/387 |
| 6,425,600 B1 * | 7/2002 | Fujiki et al. ................. 280/728.1 |
| 6,472,078 B1 | 10/2002 | Shudo |
| 7,592,069 B2 * | 9/2009 | Yaginuma et al. ............ 428/447 |
| 2004/0077236 A1 | 4/2004 | Ishii |
| 2005/0137321 A1 | 6/2005 | Dumont et al. |
| 2005/0205829 A1 | 9/2005 | Magd |
| 2005/0282453 A1 | 12/2005 | Jackson et al. |
| 2006/0122323 A1 | 6/2006 | Dumont et al. |
| 2006/0217018 A1 | 9/2006 | Parker |
| 2007/0026244 A1 | 2/2007 | Budden et al. |
| 2007/0027286 A1 | 2/2007 | Blanc-Magnard |
| 2007/0054137 A1 | 3/2007 | Mueller |
| 2008/0006179 A1 | 1/2008 | Mueller et al. |

FOREIGN PATENT DOCUMENTS

| | | |
|---|---|---|
| CN | 1372610 A | 10/2002 |
| CN | 1671916 A | 9/2005 |
| CN | 1890426 A | 1/2007 |
| CN | 1927973 A | 3/2007 |
| CN | 1968805 A | 5/2007 |
| CN | 101100550 A | 1/2008 |
| CN | 101151339 A | 3/2008 |
| CN | 101163747 A | 4/2008 |
| EP | 0103639 A1 | 3/1984 |
| EP | 0186439 A2 | 7/1986 |
| EP | 0186439 B2 | 7/1986 |
| EP | 378785 B1 | 4/1993 |
| EP | 0953675 A2 | 11/1999 |

(Continued)

OTHER PUBLICATIONS

Data sheet for silanol-terminated polydimethylsiloxanes from Gelest, 2004, 5 pages.*

(Continued)

*Primary Examiner* — Robert S Loewe
(74) *Attorney, Agent, or Firm* — RatnerPrestia

(57) ABSTRACT

The invention relates to compositions, containing (A) organopolysiloxanes, which have Si-bound hydroxy groups, (B) organopolysiloxanes, which have Si-bound hydrogen atoms, (C) platinum catalysts, (D) reinforcing fillers, (E) optionally non-reinforcing fillers, and (F) optionally inhibitors, which delay a platinum-catalyzed reaction of Si-bound hydroxy groups and Si-bound hydrogen atoms at room temperature, with the proviso that the organopolysiloxanes (A) have viscosities of 500 to 100,000,000 mPa·s at 25° C., that the platinum catalysts (C) are fame of phosphoric acid trisamide ligands, that the reinforcing fillers (D) are present in amounts of at least 3% by weight, relative to the total mass of the compositions, that the non-reinforcing fillers (F) are present in lower amounts than the reinforcing fillers (D), that the use of reactive silanes as bonding agents and the use of additional condensation catalysts, which accelerate the condensation reaction of Si-bound hydroxy groups and/or alkoxy groups, are excluded.

5 Claims, No Drawings

(56) References Cited

FOREIGN PATENT DOCUMENTS

| | | |
|---|---|---|
| EP | 1785454 A1 | 5/2007 |
| EP | 2053161 A1 | 4/2009 |
| JP | 59226036 A2 | 12/1984 |
| JP | 8151524 A2 | 6/1996 |
| JP | 10-67935 | 3/1998 |
| JP | 10067935 A | 3/1998 |
| KR | 20080072818 A | 8/2008 |
| WO | 8303209 A1 | 9/1983 |
| WO | 0112895 A1 | 2/2001 |
| WO | 02061200 A1 | 8/2002 |
| WO | 2006083339 A1 | 8/2006 |
| WO | 2006134400 A1 | 12/2006 |
| WO | 2007039763 A1 | 4/2007 |

OTHER PUBLICATIONS

International Search Report issued in PCT/EP2010/055696 filed Apr. 28, 2010, mailed Aug. 31, 2010.

* cited by examiner

COMPOSITIONS FOR TEXTILE COATINGS

CROSS REFERENCE TO RELATED APPLICATIONS

This application is the national phase filing of international patent application No. PCT/EP2010/055696, filed 28 Apr. 2010, and claims priority of German patent application number 10 2009 002 828.5, filed 5 May 2009, the entireties of which applications are incorporated herein by reference.

FIELD OF THE INVENTION

The invention concerns compositions containing organopolysiloxanes having Si-bonded hydroxyl groups and organopolysiloxanes having Si-bonded hydrogen atoms and also a process for production thereof. The invention further concerns shaped bodies, such as coatings, from these compositions, a process for production of coatings on substrates, such as textile fabrics, and also the coated textile fabrics.

BACKGROUND OF THE INVENTION

The formation of silicone networks through the reaction of SiOH-functional and SiH-functional organopolysiloxanes is long known.

U.S. Pat. No. 3,922,443 A describes a composition comprising OH-terminated diorganopolysiloxanes and organohydrogenpolysiloxanes which is preferably used for paper coating and contains up to 1,000 ppm of a platinum metal halide as catalyst.

U.S. Pat. No. 4,071,644 A describes a solvent-free composition comprising OH-terminated diorganopolysiloxanes and organohydrogenpolysiloxanes for production of release coatings which is preferably crosslinked by a tin-containing catalyst.

U.S. Pat. No. 4,028,298 A describes non-stick coatings from siloxane blends which crosslink via condensation reaction of OH-terminated diorganopolysiloxanes and organohydrogenpolysiloxanes and contain a Pt(II) chloride complex with phosphoramide ligands as catalyst.

U.S. Pat. No. 4,262,107 A describes a siloxane blend which crosslinks via condensation reaction of OH-terminated diorganopolysiloxanes and organohydrogenpolysiloxanes and contains a rhodium-based catalyst.

EP 0103639 A1 describes a solvent-free composition comprising OH-terminated diorganopolysiloxanes and organohydrogenpolysiloxanes for production of release coatings which contains a vinyl-terminated polysiloxane gum of high molecular weight (200,000-400,000 g/mol; 0.5% by weight) to speed the condensation reaction.

EP 0186439 A2 describes a siloxane blend which crosslinks via condensation reaction of OH-terminated diorganopolysiloxanes (100 mPas-100,000 Pas) and organohydrogenpolysiloxanes (1-100 mPas) and contains a platinum metal as catalyst and also bis(2-methoxyisopropyl) maleate as inhibitor.

U.S. Pat. No. 5,036,117 A describes a siloxane blend which crosslinks via condensation reaction of OH-terminated diorganopolysiloxanes and organohydrogenpolysiloxanes and contains, preferably, 100 to 300 ppm of a platinum catalyst, a maleic or fumaric diester as inhibitor and also an organic compound (e.g., a primary or secondary alcohol) as pot-life extender.

US 2007/0027286 A1 describes a siloxane blend which crosslinks via condensation reaction of OH-terminated diorganopolysiloxanes and organohydrogenpolysiloxanes and contains an iridium complex as catalyst.

U.S. Pat. No. 5,705,445 A describes aqueous silicone emulsions for coating textiles, which are formed by emulsion polymerization of polysiloxanes bearing SiOH groups with polysiloxanes bearing SiH groups and which contain as adhesion promoter up to 20% by weight of reactive organoalkoxysilanes bearing for example carboxyl, epoxy or amido groups.

WO 2006/083339 A1 describes a resin-filled addition-crosslinking silicone blend for coating textile surfaces which, in addition to the network-forming sil(ox)anes, incorporates adhesion-promoting additives, preferably as a combination of various compounds. These substances comprise high-reactivity silanes, for example (meth)acryloyloxy-functional alkoxysilanes or epoxy-functional alkoxysilanes.

US 2007/054137 A describes addition-crosslinking silicone compositions which also contain condensation-crosslinking reaction partners, for example polysiloxanes bearing SiOH groups. In addition to platinum-based catalysts, condensation catalysts, preferably in the form of zirconium or titanium compounds, and also high-reactivity silanes such as, for example, vinyl-, epoxy-, acryloyl- or acetoxy-containing alkoxysilanes as adhesion promoters are also included.

US 2005/205829 A1 describes silicone coatings for textile surfaces, which contain polyamide resin particles or up to 60% by weight of siloxane resins and up to 30% by weight of $CaCO_3$ to lower the coefficient of friction and, for example, epoxy- or alkoxy-functional silanes as adhesion promoters.

WO 2006/134400 A1 describes condensation- or addition-crosslinking organopolysiloxane compositions which contain kaolin as filler and may contain, for example, epoxy- or alkoxy-functional silanes as adhesion promoters.

WO 02/061200 A1 describes a process for textile coating with silicones wherein the coating is applied in two steps to obtain good adherence to the textile substrate and also a surface having a very low coefficient of friction.

WO 01/12895 A1 describes silicone coatings of not more than 15 $g/m^2$, which in addition to non-reinforcing fillers optionally contain a reinforcing filler such as silica in an amount of not more than 3% by weight in order that very low coefficients of friction may be obtained on coated fabrics.

EP 0953675 A2 describes silicone compositions for textile coatings, which in addition to a reinforcing filler, for example hydrophobicized silica, additionally contain a further filler in at least twice the amount based on the reinforcing filler of laminar shape in order that very low coefficients of friction may be obtained on coated fabrics.

The known compositions have a number of disadvantages. For example, very expensive compounds such as rhodium or major quantities of platinum are used as catalysts. The use of ecologically concerning or poisonous substances such as tin compounds or phosphoramide ligands is as disadvantageous as the need for substances added to achieve the desired properties for the mixtures, for example vinyl-functional polysiloxanes for more rapid curing, or primary/secondary alcohols as pot-life regulators.

The silane compounds often added as adhesion promoters, having hydrolyzable or other reactive groups, raise the costs of such systems and also have the disadvantage that they may cause an appreciable increase in viscosity when used in mixtures with fillers, for example colloidal silica. The increased viscosity has the effect that the processability of the mixtures is compromised or even rendered unimplementable for certain processing methods that require good flowability.

Compositions which, in addition to compounds from the platinum group, contain further catalysts that speed condensation reactions of hydroxysil(ox)ane or alkoxysil(ox)ane compounds (e.g., zirconium or titanium compounds) have the disadvantage that the pot life is too short for many applications, and/or an increase in viscosity is caused. This has the effect that the processability of such mixtures is compromised or even rendered unimplementable for certain processing methods that require a sufficiently long pot life and/or good flowability.

Processes where the silicone layer is applied to the textile support in two or more steps are also disadvantageous in that these methods of operation are more time- and cost-intensive than those where the entire layer of silicone is applied to the textile surface all at once.

The invention therefore has for its object to eliminate the abovementioned disadvantages and to improve the state of the art, more particularly to provide a composition which is very simple to formulate and process and provides coatings having low coefficients of friction and also good adherence to substrates, more particularly to textile substrates, and to provide a process for making it very simple to use the composition of the invention for the coating of textile surfaces.

The object is achieved by the invention.

SUMMARY OF THE INVENTION

The invention provides compositions containing
(A) organopolysiloxanes having Si-bonded hydroxyl groups,
(B) organopolysiloxanes having Si-bonded hydrogen atoms,
(C) platinum catalysts,
(D) reinforcing fillers,
(E) optionally nonreinforcing fillers, and
(F) optionally inhibitors to delay a platinum-catalyzed reaction of Si-bonded hydroxyl groups and Si-bonded hydrogen atoms at room temperature,
with the proviso that the organopolysiloxanes (A) have viscosities of 500 to 100,000,000 mPa·s at 25° C.,
that the platinum catalysts (C) are free of phosphoramide ligands,
that the reinforcing fillers (D) are included in amounts of at least 3% by weight, based on the total weight of the compositions,
that nonreinforcing fillers (F) are included in smaller amounts than the reinforcing fillers (D),
that the use of reactive silanes as adhesion promoters and the use of additional condensation catalysts to speed the condensation reaction of Si-bonded hydroxyl and/or alkoxy groups are excluded.

DETAILED DESCRIPTION OF THE INVENTION

Organopolysiloxanes (A) are preferably linear or branched organopolysiloxanes comprising units of the general formula I $$R_a^1 R_b^2 SiO \frac{4-a-b}{2},$$ (I)

where
$R^1$ denotes monovalent, aliphatic, optionally substituted $C_1$-$C_{10}$ hydrocarbon moieties, (cancel, delimitation from addition-crosslinking materials, see comparative test),
$R^2$ denotes hydroxyl groups, alkoxy groups,
a denotes the values 0, 1, 2 or 3, and
b denotes the values 0, 1, 2 or 3,
with the proviso that the sum a+b is ≤3, and that each molecule has on average at least 2 $R^2$ moieties that are hydroxyl groups.

The organopolysiloxanes can have terminal and/or lateral Si-bonded hydroxyl groups.

Examples of unsubstituted hydrocarbon moieties $R^1$ are $C_1$-$C_{10}$ alkyl, $C_1$-$C_{10}$ alkaryl or $C_1$-$C_{10}$ aralkyl moieties whose alkyl portion is saturated, or $C_1$-$C_{10}$ aryl moieties. Examples of alkyl moieties $R^1$ are methyl, ethyl, n-propyl, isopropyl, n-butyl, isobutyl, tert-butyl, n-pentyl, isopentyl, neopentyl, tert-pentyl; hexyl, such as n-hexyl and cyclohexyl; heptyl, such as n-heptyl; octyl, such as n-octyl and isooctyl, such as 2,2,4-trimethylpentyl; nonyl, such as n-nonyl; decyl, such as n-decyl; cycloalkyl, such as cyclohexyl. Examples of alkaryl moieties $R^1$ are α-phenylethyl and β-phenylethyl; examples of aralkyl moieties $R^1$ are benzyl and 2,4-diethylbenzyl; examples of aryl moieties $R^1$ are phenyl and naphthyl.

Preferably $R^1$ denotes $C_1$-$C_6$ alkyl and phenyl, especially methyl and ethyl and more preferably methyl.

Examples of substituted hydrocarbon moieties $R^1$ are 3,3,3-trifluoro-n-propyl, 2,2,2,2',2',2'-hexafluoroisopropyl, heptafluoroisopropyl, 3-chloro-n-propyl, the 2-ethyl bromide moiety, the 3-propyl bromide moiety and 3-glycidoxypropyl. Preferably the $R^1$ moieties are not substituted.

Examples of alkoxyl moieties $R^2$ are methoxy, ethoxy, n-propoxy, isopropoxy, tert-butoxy, n-butoxy and isobutoxy. Preferably alkoxyl is methoxy. Preferably $R^2$ denotes hydroxyl.

Preferably the organopolysiloxanes (A) have at least 90 and especially at least 95 mol-% of units of the general formula I in each of which the sum a+b is =2.

Preferably the organopolysiloxanes (A) have at least 60, especially at least 80 and specifically at least 90 mol-% of units of the general formula I in each of which b has the value 0.

The organopolysiloxanes (A), which have Si-bonded hydroxyl groups, preferably have at least 2 hydroxyl groups per molecule. Preferably they have terminal hydroxyl groups. The organopolysiloxanes (A) preferably have an average viscosity of at least 500 mPa·s, preferably in the range from 1,000 mPa·s to $10^8$ mPa·s and more preferably in the range from 5,000 mPa·s to 5×$10^6$ mPa·s at 25° C. The organopolysiloxanes (A) can have a molecular weight $M_n$ (number average) of 186 to 1,000,000 g/mol. The range from 260 to 500,000 g/mol is preferred. The formulation can be based on a polymer of narrow molecular weight distribution, but it is also possible to use polymers having different molecular weights. Polymers having Si-bonded hydroxyl groups in the chain can be (co)used in the formulation. The organopolysiloxanes (A) may also contain so-called T and/or Q functions and hence be described as silicone resins.

The organopolysiloxanes (A) used according to the invention may be a single species as well as a mixture of at least two species of such organopolysiloxanes (A).

Preferred organopolysiloxanes (A) are those of the general formula Ia $$HOR_2^1SiO(R_2^1SiO)_nSiR_2^1OH$$ (Ia)

where $R^1$ is as defined above and n is an integer from 10 to 5,000 and preferably from 100 to 2 000.

Organopolysiloxanes (A) can be included in amounts of 1% to 95% by weight, based on the total weight of the composition according to the invention. They may preferably be included in amounts of 50% to 90% by weight.

Organopolysiloxanes (B) are preferably linear or branched organopolysiloxanes comprising units of the general formula II $$R_c^3 R_d^4 SiO\frac{4-c-d}{2}, \quad (II)$$

where
R$^3$ denotes monovalent, aliphatic, optionally substituted C$_1$-C$_{10}$ hydrocarbon moieties,
R$^4$ denotes hydrogen,
c denotes the values 0, 1, 2 or 3, and
d denotes the values 0 or 1,
with the proviso that the sum c+d is ≤3, and that each molecule has on average at least 2 R$^4$ moieties.

The organopolysiloxanes (B) may have lateral and/or terminal Si-bonded hydrogen atoms.

Examples of unsubstituted hydrocarbon moieties R$^3$ are C$_1$-C$_{10}$ alkyl, C$_1$-C$_{10}$ alkaryl or C$_1$-C$_{10}$ aralkyl moieties whose alkyl portion is saturated, or C$_1$-C$_{10}$ aryl moieties. Examples of alkyl moieties R$^3$ are methyl, ethyl, n-propyl, isopropyl, n-butyl, isobutyl, tert-butyl, n-pentyl, isopentyl, neopentyl, tert-pentyl; hexyl, such as n-hexyl and cyclohexyl; heptyl, such as n-heptyl; octyl, such as n-octyl and isooctyl, such as 2,2,4-trimethylpentyl; nonyl, such as n-nonyl; decyl, such as n-decyl; cycloalkyl, such as cyclohexyl. Examples of alkaryl moieties R$^3$ are α-phenylethyl and β-phenylethyl; examples of aralkyl moieties R$^3$ are benzyl and 2,4-diethylbenzyl; examples of aryl moieties R$^3$ are phenyl and naphthyl.

Preferably R$^3$ denotes C$_1$-C$_6$ alkyl and phenyl, especially methyl and ethyl.

Examples of substituted hydrocarbon moieties R$^3$ are 3,3,3-trifluoro-n-propyl, 2,2,2,2',2',2'-hexafluoroisopropyl, heptafluoroisopropyl, 3-chloro-n-propyl, the 2-ethyl bromide moiety, the 3-propyl bromide moiety and 3-glycidoxypropyl.

Preferably the organopolysiloxanes (B) have at least 90 and especially at least 95 mol-% of units of the general formula II in each of which the sum c+d is =2.

Preferably the organopolysiloxanes (B) have between 5 and 100 mol-% and preferably between 20 and 100 mol-% of units of the general formula II in each of which the sum c+d is =2 and d has the value 1.

The organopolysiloxanes (B), which have Si-bonded hydrogen atoms, preferably have at least 2 SiH bonds per molecule. Preferably they have more lateral than terminal SiH bonds. The organopolysiloxanes (B) preferably have an average viscosity of 0.25 mPa·s to 10,000 mPa·s, more preferably in the range from 5 mPa·s to 5,000 mPa·s and even more preferably in the range from 10 mPa·s to 1,000 mPa·s at 25° C. The organopolysiloxanes (B) can have a molecular weight M$_n$ (number average) of 130 to 1,000,000 g/mol. The range from 500 to 100,000 g/mol is preferred. The range from 1,000 to 10,000 g/mol is more particularly preferred. The formulation can be based on a polymer of narrow molecular weight distribution, but it is also possible to use polymers having different molecular weights.

The organopolysiloxane (B) which is used according to the invention as having SiH bonds can be a single species as well as a mixture of at least two species of such organopolysiloxanes having SiH bonds.

Preferred organopolysiloxanes (B) are those of the general formula IIa $$H_g R^1{}_{3-g}SiO(R^1{}_2SiO)_k(R^1HSiO)_l SiR^1{}_{3-g}H_g, \quad (IIa)$$

where R$^1$ is as defined above,
g is 0 or 1, preferably 0, k is 0 or an integer from 1 to 500 and preferably from 0 to 300,
l is 0 or an integer from 1 to 200 and preferably from 10 to 100, with the proviso that the sum l+k is an integer from 1 to 500 and that each molecule contains on average at least 2 Si-bonded hydrogen atoms.

Formula (IIa) is for the purposes of this invention to be understood as meaning that k —(R$^1{}_2$SiO)— units and l —(R$^1$HSiO)— units can be distributed in the organopolysiloxane molecule in any desired manner, for example as block or randomly.

Organopolysiloxanes (B) can be used in amounts of 0.05% to 30% by weight, preferably in amounts of 0.1% to 20% by weight and more preferably in amounts of 0.5% to 10% by weight, all based on the total weight of organopolysiloxane (A) used.

The compositions according to the invention may contain the components (A) and (B) in different quantitative ratios. The stoichiometric molar ratio of the quantity of SiOH groups from component (A) to the quantity of SiH groups from component (B) can be in the range from 10:1 to 1:100. The stoichiometric molar ratio of SiOH groups to SiH groups is preferably in the range from 1:1 to 1:70 and more preferably in the range from 1:10 to 1:50.

Platinum catalysts (C) are platinum and/or platinum compounds. Examples of such catalysts are metallic and finely divided platinum, which can be on supports, such as silica, alumina or activated carbon; compounds or complexes of platinum, such as platinum halides, e.g., PtCl$_4$, H$_2$PtCl$_6$*6H$_2$O, Na$_2$PtCl$_4$*4H$_2$O, platinum-phosphine complexes, platinum-olefin complexes, platinum-alkyne complexes, platinum-alcohol complexes, platinum-alkoxide complexes, platinum-ether complexes, platinum-aldehyde complexes, platinum-ketone complexes, including reaction products from H$_2$PtCl$_6$*6H$_2$O and cyclohexanone, platinum-vinylsiloxane complexes, especially platinum-divinyltetramethyldisiloxane complexes with or without detectable inorganically bound halogens, bis(gamma-picoline)platinum dichloride and also reaction products of platinum tetrachloride with olefin and primary amine or secondary amine or primary amine and secondary amine, such as the reaction product with sec-butylamine of platinum tetrachloride dissolved in 1-octene, or ammonium-platinum complexes, platinum catalysts for 1 part systems, such as microencapsulated platinum complexes or, for example, platinum-acetylide complexes.

The amount in which the platinum catalyst is used is preferably in the range from 0.5 to 500 weight ppm (parts by weight per million parts by weight), especially in the range from 2 to 400 weight ppm and more preferably in the range from 5 to 100 weight ppm, all reckoned as elemental platinum and based on the total weight of components (A) and (B).

Reinforcing fillers (D) are preferably pyrogenously produced silica or precipitated silica. Particular preference is given to pyrogenously produced silica partially or fully hydrophobicized by treatment with organosilanes or halosilanes (similarly to EP 378 785 B1) for example and having a preferred BET surface area of at least 50 m$^2$/g, especially at least 100 m$^2$/g and more preferably of at least 120 m$^2$/g. The amount of filler may account for 3% to 60% by weight of the entire composition according to the invention, 5% to 45% by weight are preferred and 10% to 40% by weight are particularly preferred.

The composition may additionally also contain nonreinforcing fillers (E) such as, for example, quartz, calcium carbonate, diatomaceous earth or perlite in amounts which are each smaller than the amount of reinforcing filler (D).

Nonreinforcing fillers (E) can be used in amounts of 1 to 90 parts by weight per 100 parts by weight of reinforcing fillers (D), although their co-use is not preferred.

Inhibitors (F) are the compounds which are known to a person skilled in the art as slowing/preventing the reactions, catalyzed by platinum catalysts (C), of the reaction partners (A) and (B) at room temperature. Examples thereof are acetylenically unsaturated alcohols, such as 3-methyl-1-butyn-3-ol, 1-ethynylcyclohexan-1-ol, 3,5-dimethyl-1-hexyn-3-ol and 3-methyl-1-pentyn-3-ol. Examples of vinylsiloxane-based inhibitors are 1,1,3,3-tetramethyl-1,3-divinylsiloxane and vinyl-containing poly-, oligo- and disiloxanes. Examples of inhibitors based on unsaturated dicarboxylic acids are fumaric diesters or maleic diesters such as bis(2-methoxyisopropyl) maleate for example.

The amounts in which inhibitor (F) is used are preferably in the range from 0.01% to 2% by weight and more preferably in the range from 0.05% to 1.5% by weight, all based on the total weight of the composition according to the invention.

The compositions according to the invention are produced by mixing the components (A), (B), (C), (D) and, if used, (E) and (F).

The order of mixing the components (A), (B), (C), (D) and, if used, (E) and (F) is not decisive, but it is preferable to add component (B) last to the mixture of the other components.

The invention further provides shaped bodies obtained by allowing the compositions according to the invention to cure.

Shaped articles are obtainable by injection molding or casting. Owing to hydrogen being released by the condensation reaction of SiOH-containing organopolysiloxanes (A) with SiH-containing organopolysiloxanes (B), cellular shaped bodies can be fabricated in the process.

The compositions according to the invention are preferably used for production of coatings or overcoatings.

The invention accordingly provides a process for production of coatings by applying the composition according to the invention to the substrate to be coated and then curing the composition.

The compositions according to the invention are preferably used for coating textile fabrics such as, for example, wovens, nonwovens, drawn-loop knits, laid scrims, felts, formed-loop knits or warp knits. The textile fabrics may be fabricated from natural fibers such as cotton, wool, silk, etc. or else from manufactured fibers such as polyester, polyamide, aramid, etc. The textiles may also be fabricated from mineral fibers such as glass or silicates or metal fibers. Mixtures of different types of fiber are also possible.

The textile fabrics coated with the compositions according to the invention can be used for industrial applications, such as conveyor belts, bellow expansion joints, protective apparel, awnings, insulation or airbags. But the compositions according to the invention are also useful in the high performance textile sector, such as paragliders, hot air balloons, parachutes, outdoor apparel, sports textiles, leisure apparel, leisure articles such as tents or backpacks, sails and streetwear.

The compositions according to the invention can also be used for coating self-supporting sheets or surfaces composed of mineral materials, plastics, natural materials, paper, wood or metals.

The substrates to be coated can have the compositions according to the invention applied to them in any of the extensively described ways which is suitable for the production of coatings from liquid materials, for example by brushing, dipping, spread coating, casting, spraying, roll application, printing, knife or blade coating, padding, extrusion or jetting.

Textile fabrics can be coated with the compositions according to the invention in different thicknesses of coating. Owing to the formation of gaseous hydrogen in the course of curing the mixture, the coating can be specifically made to have blisters, holes or pores in a defined size and distribution. To this end, the viscosity, the molar quantity of SiH and/or SiOR groups, the pot life or the layer thickness can be chosen in an appropriate manner for example. To produce uninterrupted layers, the composition according to the invention is preferably applied in thin layers of 1 to 50 μm.

Drying and curing/vulcanizing the compositions according to the invention is preferably done in customary thermal ducts, which can be heated via hot air or infrared radiation or other sources of energy. The preferred temperature range is 50 to 200° C. Since some species of textile are not particularly heat-resistant, the upper temperature limit is usually dictated by the thermal stability of the textile. The residence time in the drying oven is dependent on the temperature in the thermal duct and is preferably in the range from 10 seconds to 30 minutes.

Wovens composed of glass fibers fray very badly at cuts; treatment with the compositions according to the invention prevents fraying of cut edges.

Glass dust due to breakage of fine glass fibers is fixed by finishing with the compositions according to the invention. A woven glass fabric finished in this way further exhibits elastic properties.

When the composition according to the invention was processed as textile coatings, it was found that, surprisingly, the silicone coatings produced according to the invention have very good mechanical properties which are typically only achieved with such condensation-crosslinking siloxane mixtures as contain adhesion promoters such as, for example, low molecular weight organofunctional silanes and/or further condensation accelerators such as, for example, tin, zirconium or titanium compounds, or as known for addition-crosslinking siloxane mixtures. These surprisingly observed properties are particularly advantageous for the production of silicone-coated woven fabrics used for technical devices, especially for airbags. For applications of this kind, it is preferably wovens formed from synthetic fibers, such as polyamide or polyester for example, which are silicone coated to obtain surfaces capable of withstanding the high mechanical and thermal stresses involved when an airbag is inflated by a propellant charge. For this, the coatings have to have very good adherence to the textile ground, have to be flexible throughout a wide temperature range, must not adhere together in a stack even in moist storage and/or at high temperatures, and must have a very low coefficient of friction on the surface.

Exemplary Embodiments:

Measurements recorded for the coated textile sheets were determined according to the cited ISO standards. These test methods are well established in the field of industrial textiles and specifically in the manufacture of airbags (see also "Stating requirements and test conditions for airbag material", EASC 9904 0180 of the European Airbag Standardization Committee, Edition A08) and provide a way to assess coating stability using relatively simple means.

The scrub test method (ISO 5981) tests the coated fabric's resistance to repeated and simultaneous flexing and rubbing. What is reported (in cycles) is the maximum number of repeated deformations which the textile sample can withstand without suffering damage.

The higher this value, the better the coating.

Adherence is the force in N/5 cm needed to separate two textile samples firmly adhered together via their coated surfaces, while the coating applied to the textile generally delaminates. The measured value provides information as to the strength of the bond between the textile surface and the applied and cured coating.

The higher the measured value, the better the coating.

The coefficient of friction (COF, ISO 8295) is a measure of the constitution of the coating surface in respect of stick and slip properties when the surfaces are placed on top of each other and are moved relative to each other. To this end, two coated samples of textile are placed on top of each other with the coatings and weighed down with a weight. The force needed to pull the upper sample across the lower sample is used to determine the coefficient of friction which is reported as a static value (movement from the stationary position) and as a dynamic value (movement at constant speed).

The lower these values, the better the coating with regard to use in the airbag sector.

INVENTIVE EXAMPLE 1

32 kg of linear dimethylpolysiloxane having terminal dimethylsilanol groups and a viscosity of 20,000 mPa s at 25° C., 24 kg of linear dimethylpolysiloxane having terminal dimethylsilanol groups and a viscosity of 80,000 mPa s at 25° C., 28 kg of linear dimethylpolysiloxane having terminal dimethylsilanol groups and a viscosity of 1,000 mPa s at 25° C. are mixed in a kneader with 16 kg of WACKER HDK® SKS-130 hydrophobicized colloidal pyrogenous silica having a BET surface area of 130 $m^2$/g under reduced pressure. Then, 50 g of 1-ethynylcyclohexan-1-ol and 0.11 kg of a platinum-divinyltetramethylsiloxane complex dissolved in dimethylpolysiloxane (corresponding to a platinum content of 12 ppm based on the total mass of the composition) are added with continuous mixing.

The mixture is further stirred for 15 minutes until mixing is complete.

100 g of the mass thus obtained are mixed with 7 g of a methylhydrogenpolysiloxane having trimethylsilyl end groups and a viscosity of 25 mPa s at 25° C.

This mixture is blade coated onto a woven nylon-6,6 fabric (470 dtex; 185 g/$m^2$ loom state weight) and vulcanized in a circulating air oven at 170° C. for 2 minutes.

The woven fabric thus coated has a coating weight of 27 g/$m^2$ and gives rise to the following measured values:

| Scrub: | 1900 cycles | (ISO 5981) |
|---|---|---|
| Adherence: | 280 N/5 cm | (ISO 53530) |
| Coefficient of friction: | 0.2642 (static) | |
| | 0.1614 (dynamic) | (ISO 8295) |

INVENTIVE EXAMPLE 2

44 kg of linear dimethylpolysiloxane having terminal dimethylsilanol groups and a viscosity of 20,000 mPa s at 25° C. and 44 kg of linear dimethylpolysiloxane having terminal dimethylsilanol groups and a viscosity of 80,000 mPa s at 25° C. are mixed in a kneader with 12 kg of WACKER HDK® SKS-130 hydrophobicized colloidal pyrogenous silica having a BET surface area of 130 $m^2$/g under reduced pressure. Then, 50 g of 1-ethynylcyclohexan-1-ol and 0.11 kg of a platinum-divinyltetramethylsiloxane complex dissolved in dimethylpolysiloxane (corresponding to a platinum content of 12 ppm based on the total mass of the composition) are added with continuous mixing.

The mixture is further stirred for 15 minutes until mixing is complete.

100 g of the mass thus obtained are mixed with 7 g of a methylhydrogenpolysiloxane having trimethylsilyl end groups and a viscosity of 25 mPa s at 25° C.

This mixture is blade coated onto a woven nylon-6,6 fabric (470 dtex; 185 g/$m^2$ loom state weight) and vulcanized in a circulating air oven at 170° C. for 2 minutes.

The woven fabric thus coated has a coating weight of 28 g/$m^2$ and gives rise to the following measured values:

| Scrub: | 1700 cycles | (ISO 5981) |
|---|---|---|
| Adherence: | 220 N/5 cm | (ISO 53530) |
| Coefficient of friction: | 0.1249 (static) | |
| | 0.0678 (dynamic) | (ISO 8295) |

INVENTIVE EXAMPLE 3

88 kg of linear dimethylpolysiloxane having terminal dimethylsilanol groups and a viscosity of 50,000 mPa s at 25° C. are blade stirrer mixed with 12 kg of WACKER HDK® SKS-130 hydrophobicized colloidal pyrogenous silica having a BET surface area of 130 $m^2$/g.

Then, 50 g of 1-ethynylcyclohexan-1-ol and 0.11 kg of a platinum-divinyltetramethylsiloxane complex dissolved in dimethylpolysiloxane (corresponding to a platinum content of 12 ppm based on the total mass of the composition) are added with continuous mixing. The mixture is further stirred for 15 minutes until mixing is complete.

100 g of the mass thus obtained are mixed with 5 g of a methylhydrogenpolysiloxane having trimethylsilyl end groups and a viscosity of 25 mPa s at 25° C.

This mixture is blade coated onto a woven nylon-6,6 fabric (470 dtex; 185 g/$m^2$ loom state weight) and vulcanized in a circulating air oven at 170° C. for 2 minutes.

The woven fabric thus coated has a coating weight of 28 g/$m^2$ and gives rise to the following measured values:

| Scrub: | 1800 cycles | (ISO 5981) |
|---|---|---|
| Adherence: | 230 N/5 cm | (ISO 53530) |
| Coefficient of friction: | 0.126 (static) | |
| | 0.065 (dynamic) | (ISO 8295) |

COMPARATIVE EXAMPLE 1

12.2 kg of linear dimethylpolysiloxane having terminal dimethylvinylsilyl groups and a viscosity of 900 mPa s at 25° C., 7.3 kg of linear dimethylpolysiloxane having terminal dimethylvinylsilyl groups and a viscosity of 7,000 mPa s at 25° C., 45 kg of linear dimethylpolysiloxane having terminal dimethylvinylsilyl groups and a viscosity of 20,400 mPa s at 25° C., 12.5 kg of linear dimethylpolysiloxane having terminal dimethylvinylsilyl groups and a viscosity of 1,000 mPa s at 25° C. are mixed in a dissolver with 19 kg of WACKER HDK® SKS-130 hydrophobicized colloidal pyrogenous silica having a BET surface area of 130 $m^2$/g.

Then, 25 g of 1-ethynylcyclohexan-1-ol, 0.25 kg of a platinum-divinyltetramethylsiloxane complex dissolved in dimethylpolysiloxane (corresponding to a platinum content of 28 ppm based on the total mass of the composition) and 42 g of cerium 2-ethylhexanoate solution (40% in Naphtha) are added with continuous mixing.

The mixture is further stirred for 15 minutes until mixing is complete.

100 g of the mass thus obtained are mixed with 1 g of 3-glycidoxypropyltriethoxysilane and 4 g of methylhydrogenpolysiloxane having trimethylsilyl end groups and a viscosity of 25 mPa s at 25° C.

This mixture is blade coated onto a woven nylon-6,6 fabric (470 dtex; 185 g/m² loom state weight) and vulcanized in a circulating air oven at 170° C. for 2 minutes.

The woven fabric thus coated has a coating weight of 26 g/m² and gives rise to the following measured values:

| Scrub: | 1100 cycles | (ISO 5981) |
|---|---|---|
| Adherence: | 220 N/5 cm | (ISO 53530) |
| Coefficient of friction: | 0.3142 (static) | |
| | 0.1788 (dynamic) | (ISO 8295) |

The invention claimed is:

1. A process for production of a coating, comprising applying a composition to a textile fabric and then curing the composition, wherein the composition consists of
    (A) organopolysiloxanes of the general formula (Ia)

$$HOR^1{}_2SiO(R^1{}_2SiO)_nSiR^1{}_2OH \quad (Ia)$$

where
        $R^1$ in each occurrence denotes $C_1$-$C_{10}$ alkyl, α-phenylethyl, β-phenylethyl, benzyl, 2,4-diethylbenzyl, phenyl or naphthyl, and
        n is an integer from 10 to 5,000,
    (B) organopolysiloxanes having Si-bonded hydrogen atoms,
    (C) platinum catalysts,
    (D) reinforcing fillers,
    (E) optionally nonreinforcing fillers, and
    (F) optionally inhibitors to delay a platinum-catalyzed reaction of Si-bonded hydroxyl groups and Si-bonded hydrogen atoms at room temperature,
    with the proviso that the organopolysiloxanes (A) have viscosities of 500 to 100,000,000 mPa·s at 25° C.,
    that the platinum catalysts (C) are free of phosphoramide ligands,
    that the reinforcing fillers (D) are included in amounts of at least 3% by weight, based on the total weight of the composition, and
    that nonreinforcing fillers (E) are included in smaller amounts than the reinforcing fillers (D).

2. The process according to claim 1, wherein the curing is effected at temperatures of 50 to 200° C.

3. The process according to claim 1, wherein the textile fabric is an airbag material.

4. A coated textile fabric coated with a composition consisting of
    (A) organopolysiloxanes of the general formula (Ia)

$$HOR^1{}_2SiO(R^1{}_2SiO)_nSiR^1{}_2OH \quad (Ia)$$

where
        $R^1$ in each occurrence denotes $C_1$-$C_{10}$ alkyl, α-phenylethyl, β-phenylethyl, benzyl, 2,4-diethylbenzyl, phenyl or naphthyl, and
        n is an integer from 10 to 5,000,
    (B) organopolysiloxanes having Si-bonded hydrogen atoms,
    (C) platinum catalysts,
    (D) reinforcing fillers,
    (E) optionally nonreinforcing fillers, and
    (F) optionally inhibitors to delay a platinum-catalyzed reaction of Si-bonded hydroxyl groups and Si-bonded hydrogen atoms at room temperature,
    with the proviso that the organopolysiloxanes (A) have viscosities of 500 to 100,000,000 mPa·s at 25° C.,
    that the platinum catalysts (C) are free of phosphoramide ligands,
    that the reinforcing fillers (D) are included in amounts of at least 3% by weight, based on the total weight of the composition, and
    that nonreinforcing fillers (E) are included in smaller amounts than the reinforcing fillers (D).

5. The coated textile fabric according to claim 4, wherein n is an integer from 100 to 2000.

* * * * *

UNITED STATES PATENT AND TRADEMARK OFFICE
CERTIFICATE OF CORRECTION

PATENT NO. : 8,658,547 B2
APPLICATION NO. : 13/318739
DATED : February 25, 2014
INVENTOR(S) : Christian Peschko and Johann Müller It is certified that error appears in the above-identified patent and that said Letters Patent is hereby corrected as shown below:

On the Title Page, ITEM [57], Abstract, "(C) are fame of phosphoric" should read
-- (C) are free of phosphoric --

Signed and Sealed this
Twenty-seventh Day of May, 2014

Michelle K. Lee
*Deputy Director of the United States Patent and Trademark Office*